United States Patent [19]
Rule

[11] 3,863,743
[45] Feb. 4, 1975

[54] SUBASSEMBLY FOR MAGNETIC FRICTION COUPLING

[75] Inventor: Robert D. Rule, Rockford, Ill.

[73] Assignee: Warner Electric Brake & Clutch Company, South Beloit, Ill.

[22] Filed: Oct. 5, 1973

[21] Appl. No.: 403,931

[52] U.S. Cl. ............................... 192/84 C, 29/434
[51] Int. Cl. ............................................ F16d 27/10
[58] Field of Search ............. 192/18 B, 84 R, 84 C; 188/161, 162, 163; 310/103, 104, 105, 106; 29/434

[56] References Cited
UNITED STATES PATENTS

| | | |
|---|---|---|
| 3,322,249 | 5/1967 | Klinkenberg et al. ............. 192/18 B |
| 3,438,471 | 4/1969 | Wrensch ....................... 192/84 C X |
| 3,446,322 | 5/1969 | Wrensch ....................... 192/84 C X |
| 3,584,715 | 6/1971 | Miller ............................ 192/84 C X |
| 3,624,768 | 11/1971 | Nussli .............................. 192/84 C |

*Primary Examiner*—Allan D. Herrmann
*Attorney, Agent, or Firm*—Wolfe, Hubbard, Leydig, Voit & Osann, Ltd.

[57] ABSTRACT

A radially projecting flange on the magnet of a magnetic friction coupling fits into a radially opening groove in the rotor of the coupling to locate the rotor axially with respect to the magnet.

7 Claims, 3 Drawing Figures

(PRIOR ART)

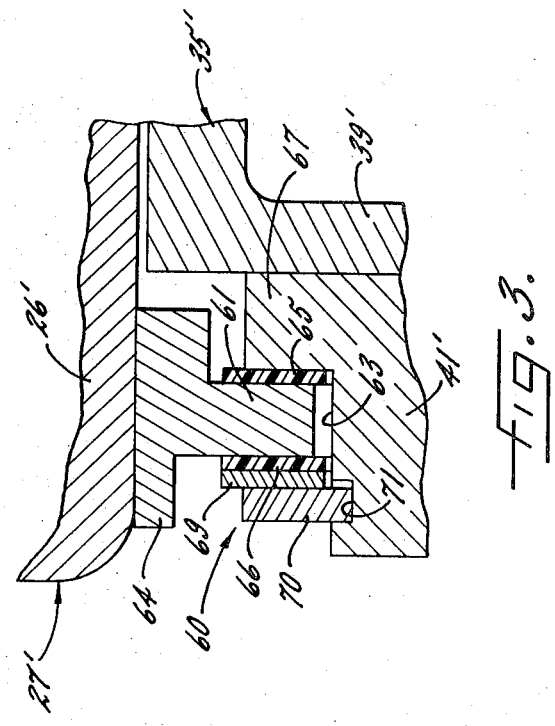
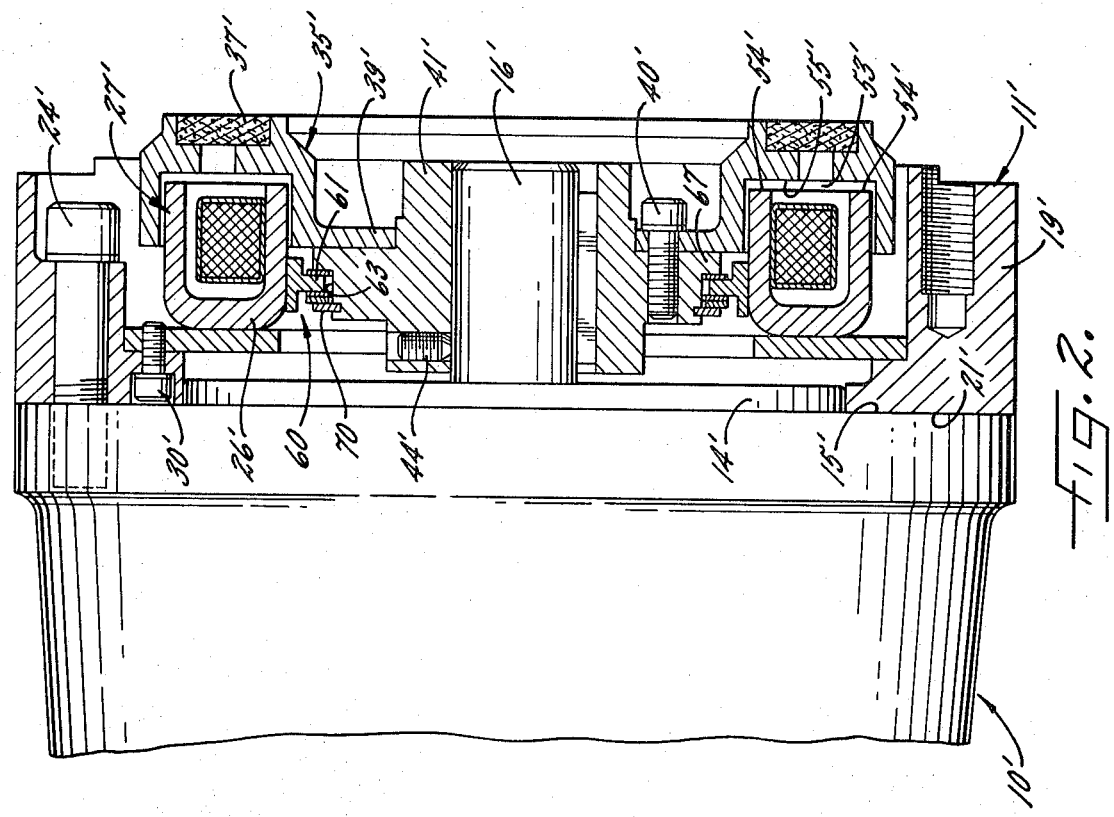

SUBASSEMBLY FOR MAGNETIC FRICTION COUPLING

BACKGROUND OF THE INVENTION

This invention relates to a subassembly for a magnetic friction coupling of the same general type as disclosed in Klinkenberg et al. U.S. Pat. No. 3,322,249. Such a coupling includes a clutch input module comprising a frame, an annular magnet which is fixed to the frame, and a rotor which is telescoped with and rotates relative to the magnet. When the module is installed in the field, the rotor is attached to a rotary input shaft and the frame and the magnet are located in a fixed position relative to the shaft. An output module having an armature and a rotary output shaft then is attached to the input module. When the magnet is energized, the armature is drawn into frictional engagement with the rotor to engage the clutch and cause the input shaft to drive the output shaft.

In order for the clutch input module to function correctly, it is necessary to establish proper radial spacing and proper axial spacing between the magnet and the rotor. With the Klinkenberg et al coupling, the proper radial spacing is established automatically when the assembler of the coupling, usually the purchaser, fixes the frame of the input module in place and attaches the rotor to the input shaft. It is necessary, however, for the assembler to telescope the rotor with the magnet and then adjust the rotor axially relative to the magnet to establish the proper axial spacing. The assembler must rely upon gages or the like to determine the proper axial location of the rotor.

SUMMARY OF THE INVENTION

The general aim of the present invention is to provide a new and improved clutch input unit of the above general type and having relatively simple and low cost means for axially interconnecting the magnet and the rotor and establishing the proper axial spacing between the two so that the input unit may be sold and shipped as a unitary assembly and without need of the purchaser adjusting and locating the rotor axially relative to the magnet.

A further object is to provide means which axially interconnect and locate the magnet and the rotor only temporarily and until such time as the rotor is attached to the input shaft to permanently fix the axial positions of the magnet and rotor. The axial connecting and locating means serve no function during operation of the coupling and it thus is possible to use comparatively low cost, light duty connecting and locating means.

A more detailed object is to provide axial connecting and locating means in the form of an interfitting flange and groove on the magnet and the rotor, the flange and groove coacting to axially locate the rotor with respect to the magnet while permitting radial floating of the rotor relative to the magnet prior to anchoring of the rotor to the input shaft.

Still another object is to make the axially facing end walls of the groove from an easily wearable material which the flange may abrade away during rotation of the rotor if the flange should happen to bear against the walls so tightly as to initially restrict free rotation of the rotor.

These and other objects and advantages of the invention will become more apparent from the following detailed description when taken in conjunction with the accompanying drawings.

BRIEF DESCRIPTION OF THE DRAWINGS

FIG. 1 is an exploded side elevational view of a coupling similar to that disclosed in the aforementioned Klinkenberg et al. patent, parts of the coupling being broken away and shown in section.

FIG. 2 is a fragmentary view similar to FIG. 1 but shows a new and improved coupling subassembly embodying the novel features of the present invention.

FIG. 3 is an enlarged view of parts shown in FIG. 2.

DETAILED DESCRIPTION OF THE PREFERRED EMBODIMENTS

Figure 1:
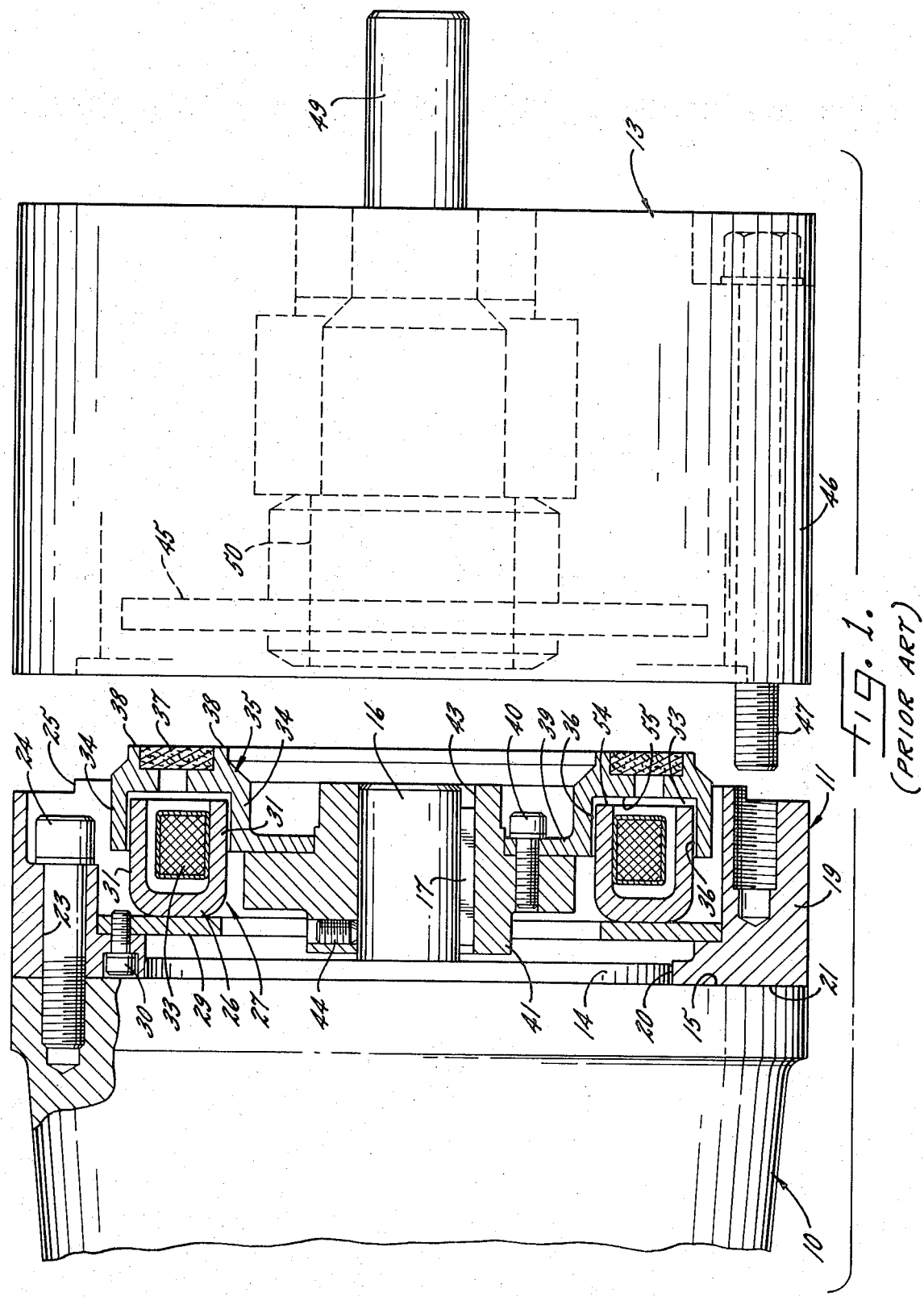
FIG. 1 shows a typical prior art magnetic friction coupling of the type upon which the present invention improves. Specifically.

An appreciation of the present invention may be best gained by understanding the construction of a motor mounted clutch assembly of the type sold for several years by Warner Electric Brake & Clutch Company under model designation EM-180-10. Such an assembly is shown in FIG. 1 of the drawings and is generally similar to the assembly shown in FIG. 14 of the aforementioned Klinkenberg et al. patent.

Shown in FIG. 1 are a motor 10 and a magnetic friction coupling formed by a power input or clutch module 11 and a power output module 13 which, in this particular instance, is a clutch output module but which could be a brake module. The motor 10 includes an end face constructed in accordance with well established National Electrical Manufacturers Association (NEMA) standards, the end face being defined by a narrow cylindrical male pilot 14 projecting from a generally flat end 15 of the motor casing and substantially concentric with the projecting end 16 of the motor shaft which is equipped with a key 17.

The clutch input subassembly or module 11 includes a generally cylindrical ring-like frame or casing 19 having a central bore 20 at one end constituting a female pilot and adapted to telescope closely around the male pilot 14 when the casing end 21 is brought into abutment with the end 15 of the motor 10. Holes 23 paralleling the casing axis extend through the casing for receiving cap screws 24 by which the casing may be clamped against the motor casing, the number, size and spacing of the holes matching those of the standard NEMA motor. Beyond the screw heads, the casing is formed with an annular male pilot 25 adapted to telescope closely with the clutch output module 13.

Disposed in the casing 19 is the annular core 26 of a clutch magnet 27 which is welded, brazed or otherwise fixed to a ring 29 which, in turn, is anchored rigidly to the end wall of the casing by cap screws 30. The core is of U-shaped cross-section having concentric pole pieces 31 enclosing a multiple turn winding 33. Telescoped around the inner and outer surfaces of the pole pieces 31 are the pole pieces 34 of a magnet rotor 35 separated from the magnet by narrow radial air gaps 36. The annular pieces 34 are rigidly joined together by high reluctance or non-magnetic material (not shown), and a ring 37 of molded friction material is fixed to the pole pieces with one end face of the ring being flush with the rotor pole faces 38 to form one friction face of the clutch.

Integral with the inner end of the inner rotor pole piece 34 is a radial flange 39 which is clamped by a plurality of cap screws 40 to a sleeve 41 defining the hub of the rotor 35. The hub is sized to telescope closely over the end of the motor shaft 16 and is formed with an internal keyway 43 which receives a substantial length of the key 17 when the module 11 is bolted to the end of the motor 10. The position of the hub 41 and rotor 35 along the motor shaft is fixed by tightening one or more set screws 44.

The magnet core 26 and rotor 35 cooperate with a flat armature ring 45 of magnetic material which spans the pole faces 38 and completes a flux circuit of toroidal shape. The armature 45 is housed within the output module 13 which comprises a ring-like housing 46 adapted to be telescoped onto the pilot 25 and attached to the input housing 19 by cap screws 47. Journaled within the housing 46 is an output shaft 49 whose inner end carries an exteriorly splined collar 50 onto which the armature is splined so that the armature is prevented from rotating on the collar while being slidable axially along the collar. When the winding 33 is energized, the armature 45 is drawn into gripping engagement with the rotor 35 so as to cause the output shaft 49 to turn in unison with the motor shaft 16, the clutch being released when the winding is de-energized.

By virtue of the construction of the magnet 27 and rotor 35, the desired narrow width of the two radial air gaps 36 is established and maintained automatically as an incident to assembly of the clutch input module 11 to the motor 10. That is to say, the transaxial position of the magnet pole pieces 31 is fixed by telescoping of the casing 19 onto the motor pilot 14 while the position of the rotor pole pieces 34 is fixed by the telescoping of the hub 41 onto the motor shaft 16. It is incumbent upon the assembler, however, to establish an axial gap 53 of proper length (herein, on the order of 0.060 ± 0.010 inch) between the end surfaces 54 of the pole pieces 31 and the opposing surface 55 of the rotor 35 so as to prevent such surfaces from rubbing and to establish the proper magnetic relationship between the pole pieces and the rotor. Usually, the assembler establishes the axial gap 53 by telescoping the hub 41 onto the shaft 16 until the surface 55 abuts the pole faces 54 and then by backing the rotor off through the required distance before tightening the set screw 44 to anchor the rotor axially on the shaft. In the majority of cases, assembly of the clutch input module 11 to the motor 10 is done in the field by the purchaser of the module and thus the need to establish the axial gap 53 requires time and effort on the part of the purchaser and, since the purchaser is sometimes unfamiliar with the assembly technique, an axial gap of improper length may be established.

The present invention brings to the art a new and improved clutch input module 11' shown in FIG. 2 in which elements corresponding to the elements shown in FIG. 1 are indicated by the same but primed reference numerals. Such a module includes unique and relatively simple and inexpensive connecting and locating means 60 by which the magnet 27' and rotor 35' may be assembled to one another at the factory and which automatically establish the proper axial gap 53' between the magnet and the rotor while leaving the two free for relative radial floating until such time as the module is attached to the motor 10'. By virtue of the connecting and locating means 60, the clutch input module may be shipped to the purchaser as a unitary assembly, there is no need for the purchaser to establish the proper axial gap and yet, as will become more apparent, the connecting and locating means serve no function once the clutch module is installed and thus the connecting and locating means may be made with comparatively low cost components and manufacturing techniques.

In the present instance, the connecting and locating means 60 are defined by a radially projecting flange 61 (FIG. 3) and a radially opening groove 63 which interfit with one another to prevent axial separation of the magnet 27' and the rotor 35' while permitting relative rotation and initially permitting relative radial floating. While the flange could be rigid with the rotor and fit into an opposing groove in an axially stationary part of the module 11', the flange herein is anchored to the stationary part and preferably to the magnet core 26'. As shown, the flange is integral with and projects radially inwardly from a ring 64 which is brazed or otherwise rigidly secured to the inner annular surface of the magnet core. The flange fits with axial and radial clearance into the groove 63 which extends circumferentially around and opens radially outwardly from the hub 41', the outer surface of the hub defining the bottom of the groove and a pair of ring-like shims 65 and 66 defining the axially facing end walls of the groove. The shim 65 is backed by a radially projecting flange 67 on the hub while the shim 66 is backed by a smooth metal shim 69 which, in turn, is held in place by a snap ring 70 contracted releasably into a narrow groove 71 formed in the hub. One may consider that the flange 67 and the shim 69 define an annular slot for receiving the shims 65 and 66 defining the groove 63.

With the foregoing arrangement, assembly of the rotor 35' and the magnet 27' with the attached flange 61 is effected at the factory by sequentially telescoping the shim 65, the flange 61 and the shims 66 and 69 onto the hub 41' and then by installing the snap ring 70 to captivate the telescoped parts on the hub. As a result, the magnet and the rotor become a unitary subassembly which can be attached to the casing 19' (FIG. 2) by the screws 30' to enable shipment of the module 11' as a single assembly. In addition, the proper axial gap 53' between the pole faces 54' and the rotor surface 55' is established automatically as an incident to assembly of the magnet and the rotor so as to relieve the purchaser of this burden and to eliminate the possibility of improper gapping. All the purchaser need do is telescope the hub 41' over the motor shaft 16' with the casing end 21' in abutment with the end face 15' of the motor 10', fasten the casing to the motor with the cap screws 24' and then fasten the hub to the shaft with the set screw 44'. Because of the radial clearance between the inner edge of the flange 61 and the bottom of the groove 63 (FIG. 3), the magnet 27' and the rotor 35' may float radially with respect to one another during assembly of the module 11' to the motor 10' and may seek radial positions compatible with any eccentricity which might exist between the motor pilot 14' and shaft 16' or between the shaft and its bearings. Accordingly, the axial connecting and locating means 60 do not restrict the ability of the clutch module to conform radially to the motor.

A significant advantage of the invention is that precision interfitting of the flange 61 and the groove 63 is not required or desired in that it is intended that there be axial clearance between the flange and the groove to allow the rotor 35' to turn freely relative to the magnet 27'. Accordingly, it is necessary only that the parts be dimensional so as to limit the total axial play between the flange and the hub 41' to a value somewhat less than the tolerance permitted in establishing the axial gap 53'. Because axial play may exist, it is possible that in assembling the module 11' to the motor 10', the installer might anchor the hub 41' along the shaft 16' in a position in which the flange presses heavily against either the shim 65 or the shim 66. This possibly does not create any problem, however, because in carrying out the invention, the shims 65 and 66 are made of a readily wearable material such as Teflon. If the flange 61 rubs against either shim 65 or 66, the shim simply abrades away upon initial rotation of the rotor 35' and thus enables the rotor to rotate freely. Wearing away of either shim does not affect the relative positions of the magnet and the rotor, since by the time any wear occurs, the positions of the magnet and rotor are fixed by the screws 24' and 44', respectively. If it should happen that the installer locates the hub in such a position that the flange bears very tightly against either shim, the motor 10' will not start rotating but instead will stall so as to indicate to the installer that re-positioning of the hub is necessary.

From the foregoing, it will be apparent that the present invention provides comparatively simple means 60 which temporarily connect and axially locate the magnet 27' and rotor 35'. Once the axial positions of these elements have become permanently fixed by virtue of their attachment to the motor 10', the temporary connecting and locating means are not required to perform any further function and thus these means may be formed by the low cost flange 61 and groove 63.

I claim as my invention:

1. A subassembly for a magnetic friction coupling and comprising a frame member adapted to be fixed axially and radially with respect to a rotatable shaft, an annular magnet member fixed axially and radially with respect to said frame member, a rotor telescoped with and rotatable relative to said magnet member and adapted to be telescoped with and anchored to said shaft, there being a bearingless fit and radial clearance between all telescoped parts of said magnet member and said rotor so as to permit radial floating of said rotor relative to said magnet member prior to telescoping of said rotor with said shaft, and means coacting between said rotor and one of said axially and radially fixed members to locate said rotor axially relative to said magnet member without preventing said radial floating of said rotor relative to said magnet member, said means comprising a flange projecting radially from one of said rotor and said one axially and radially fixed member, and a groove extending circumferentially around and opening radially from the other of said rotor and said one axially and radially fixed member and receiving said flange with radial clearance.

2. A subassembly for a magnetic friction coupling and comprising a frame member adapted to be fixed axially and radially with respect to a rotatable shaft, an annular magnet member anchored axially and radially with respect to said frame member, a rotor telescoped with and rotatable relative to said magnet member and adapted to be telescoped with and anchored to said shaft, there being a bearingless fit and radial clearance between all telescoped parts of said magnet member and said rotor so as to permit radial floating of said rotor relative to said magnet member prior to telescoping of said rotor with said shaft, and means locating said rotor axially relative to said magnet member without preventing said radial floating of said rotor relative to said magnet member, said means comprising a flange projecting radially inwardly from one of said members, and a groove extending circumferentially around and opening radially outwardly from said rotor and receiving said flange with radial clearance.

3. A subassembly as defined in claim 2 in which the axially facing walls of said groove receive said flange with a small amount of axial clearance so as to enable said rotor to rotate relative to said magnet member.

4. A subassembly as defined in claim 3 in which the axially facing walls of said groove are made of a material which wears more easily than the material of said flange and which is adapted to wear away as an incident to initial rotation of said rotor whereby to establish sufficient axial clearance between said groove and said flange to enable said rotor to rotate freely relative to said magnet member after initial rotation of said rotor.

5. A subassembly as defined in claim 2 in which said rotor includes a slot which extends circumferentially around and opens radially out of said rotor, the axially facing end walls of said groove being defined by a pair of axially spaced, ring-like shims received within said slot adjacent the axially facing end walls thereof and made of a material which wears more easily than the material of said flange.

6. A subassembly as defined in claim 2 in which one of the axially facing end walls of said groove is removably attached to said rotor thereby to enable said flange to enter said groove as an incident to telescoping of said rotor with said one member prior to attachment of said one wall to said rotor.

7. A subassembly for a magnetic friction coupling and comprising a generally cylindrical housing adapted to be anchored in an axially and radially fixed position with respect to a shaft supported to rotate within and relative to the housing, a ring-like magnet anchored within and coaxial with said housing, a rotor telescoped with and rotatable relative to said magnet and adapted to be telescoped with and anchored to said shaft, there being a bearingless fit and radial clearance between all telescoped parts of said magnet and said rotor so as to permit radial floating of said rotor relative to said magnet prior to telescoping of said rotor with said shaft, and means locating said rotor axially relative to said magnet without preventing said radial floating of said rotor relative to said magnet, said means comprising a flange projecting radially inwardly from one of said housing and said magnet, and a groove extending circumferentially around and opening radially from said rotor and receiving said flange with radial clearance, the end walls of said groove being made of a material which wears more easily than the material of said flange and which is capable of wearing away as an incident to initial rotation of said rotor thereby to establish sufficient axial clearance between said flange and said groove to enable said rotor to rotate freely relative to said magnet after initial rotation of said rotor if such clearance is not present during such initial rotation, and one of said end walls being removably attached to said rotor thereby to enable said flange to enter said groove by being moved axially into the groove prior to attachment of said one end wall to said rotor.

* * * * *